Patented Feb. 24, 1953

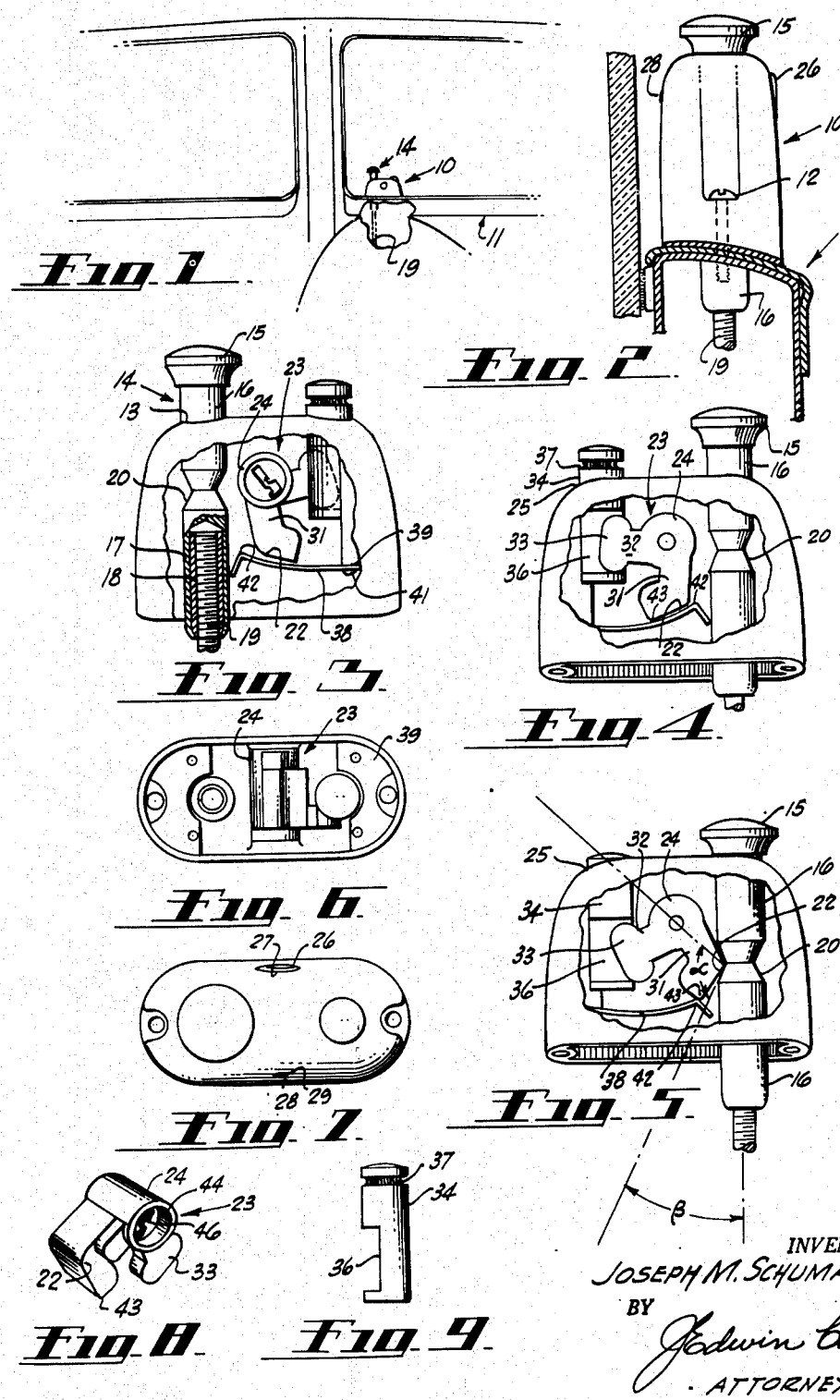

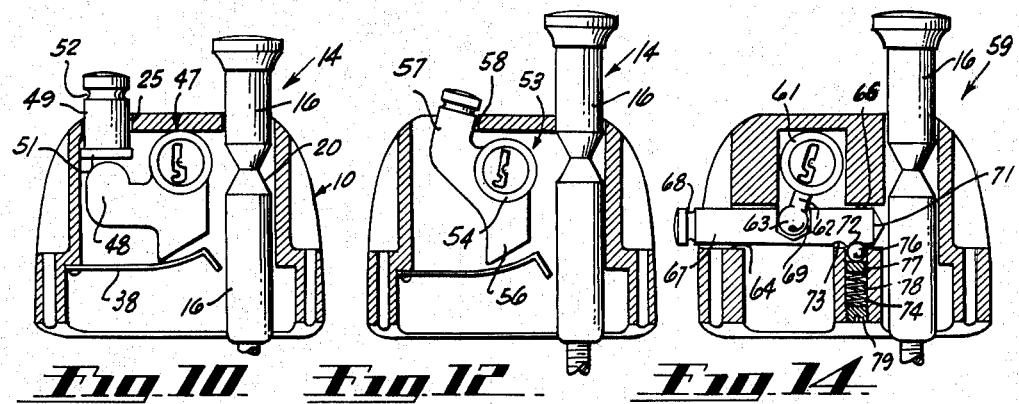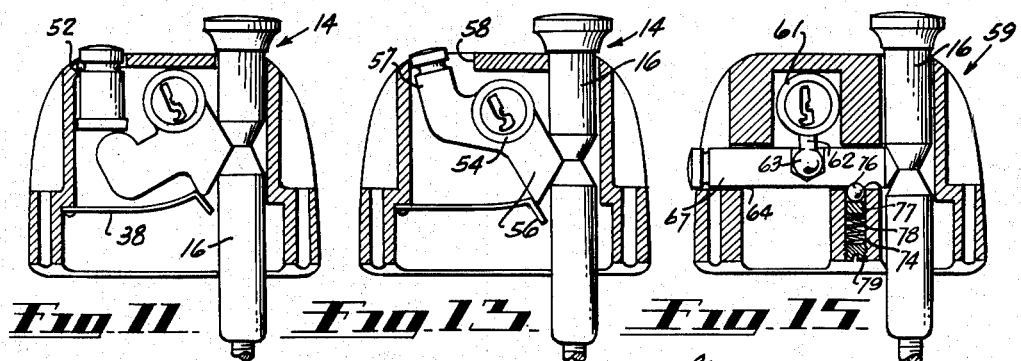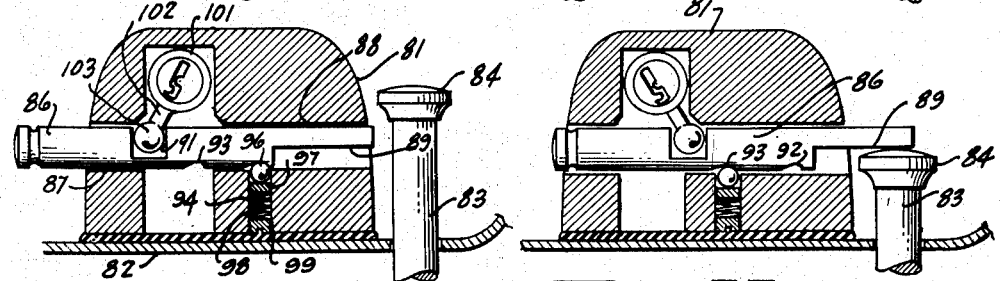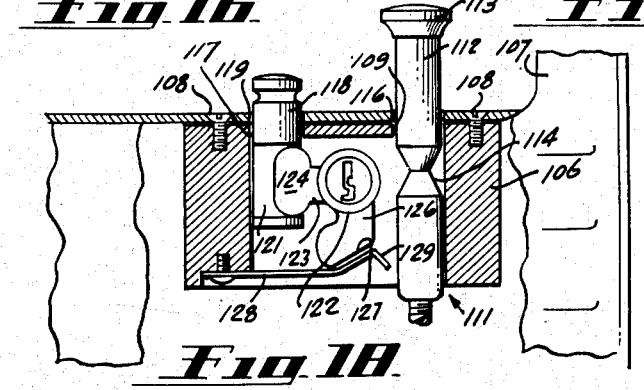

2,629,246

UNITED STATES PATENT OFFICE 2,629,246

SAFETY DOOR LATCH

Joseph M. Schumann, Inglewood, Calif., assignor of twenty-five per cent to Alta Engineering Company, Santa Monica, Calif., a limited partnership of California Application March 7, 1949, Serial No. 80,061

10 Claims. (Cl. 70—181)

This invention relates to automotive passenger vehicles and particularly to the door locking mechanisms of passenger automobiles.

The majority of automobiles now on the market are provided with door locking mechanisms which include a latch engageable with a keeper on the door frame and both interior and exterior devices for releasing the latch from engagement with the keeper. These mechanisms further include a lock which can be operated to prevent release of the latch by either of said devices to prevent unauthorized entry and to forestall accidental opening of the door from the interior. This lock is usually operated by a small lock operator in the form of a button, pin, or handle slidably mounted for passage thru the window frame of the door. When the pin is pushed in or depressed it locks the latch mechanism, and when it is pulled out it unlocks it.

The problem of the safety of children in the rear seat of an automobile is rather minor in the case of a vehicle having only one door on each side of the body, both because the latch mechanism is usually inaccessible from the rear seat and because the passageway from the rear seat is effectively blocked when the front seat is occupied. However, in vehicles having two doors on each side, the rear door is exclusively for the use of the rear seat passengers and consequently it can be readily unlatched from the rear seat and, when open, it affords ready egress therefrom. While the lock button or pin, in depressed position, prevents accidental operation of the latch mechanism, a child alone in the rear seat can readily raise the button and then unlatch the door while the vehicle is in motion. If the child is gripping some part of the door at such time the sudden opening will catapult him or her thru the doorway. Every year a large number of such accidents occur, with serious and frequently fatal results.

Various schemes and devices have been proposed in the past to overcome this safety hazard, including the elimination of interior latch mechanism operators from the rear doors and the use of special bolts engaging the rear doors and held in position by the front doors when closed. All of these schemes have had disadvantages which have prevented their general adoption and it is the purpose of the present invention to provide a positive means for preventing unlatching of vehicle doors which may be readily mounted on existing vehicles or may be built into new ones, which is extremely easy to attach and to operate, and which does not interfere in any way with normal operation of the conventional mechanism.

The invention hereinafter described in detail is, in its presently preferred form, an attachment which may be mounted on the window frame of a vehicle body door and may be selectively operated to prevent or to permit the unlatching of the door.

In one form of the invention a special lock operator is substituted for the conventional one. This operator is provided with a cam surface for engagement by a latch carried by a special support. The support comprises a generally rectangular casing having pivot means to mount said latch. Over-center spring means hold the latch in either operative or inoperative position and a push button slidably mounted in the casing is actuated to move the latch to operative position.

In these circumstances the push button is substantially flush with the surface of the casing and cannot be grasped with the fingers to retract it. Consequently a child cannot possibly unlock the latching mechanism of the door. When the driver wishes to unlock the door after the vehicle has been stopped, he merely applies the ignition key to a key slot built into the latch and turns it to retract the latch.

In another form of the invention the latch carrying support means may be mounted entirely within the door structure so that the device is hardly noticeable and yet it will retain all of its functions and advantages. In still another form no special lock button is needed and the latch is movable to a position completely overlying the lock button.

In all forms the latch may be selectively used. Hence, when there are adults in the rear seat the latch is left inoperative and the door is operated in conventional fashion. Since the unlocking feature is accomplished with the ignition key no special devices are necessary. The invention is applied individually to the lock operator of a single door and avoids the complexity and inconvenience of devices which depend for their operation upon the coaction of separate doors.

The presently preferred forms of the invention are illustrated in the accompanying drawings, in which:

Figure 1 is a fragmentary interior elevational view of a vehicle body showing the invention mounted on a door thereof;

Figure 2 is a sectional elevational view of a portion of the vehicle door showing the relative position and the manner of mounting the invention thereon;

Figure 3 is a side elevational view of the latch device of the invention in inoperative position with a portion of the casing broken away to show the position and arrangement of parts;

Figure 4 is a view similar to Figure 3 but taken from the opposite side;

Figure 5 is a view similar to Figure 4 but showing the parts in operative latching position;

Figure 6 is a bottom plan view of the device of Figure 3 with the spring removed for clarity of illustration;

Figure 7 is a top plan view of the device of Figure 3;

Figure 8 is a three quarter perspective view of the latch member;

Figure 9 is a side elevational view of the latch operator;

Figure 10 is a view similar to Figure 4 showing a modified latch and operator;

Figure 11 is a view similar to Figure 5 and showing said modification;

Figure 12 is a view similar to Figure 4 showing another modification with a combined latch and operator;

Figure 13 is a view similar to Figure 5 and showing said modification;

Figure 14 is a view similar to Figure 4 showing a further modification with a slidable combined latch and operator;

Figure 15 is a view similar to Figure 5 and showing said modification;

Figure 16 is a view similar to Figure 4 showing a modification in which the latch is adapted to overlie the lock button in operative position;

Figure 17 is a view similar to Figure 5 and showing said modification; and

Figure 18 is a fragmentary elevational view of a vehicle door with a portion broken away to show the device arranged within the door structure.

The invention, in the form illustrated on sheet 1 of the drawings, includes a support, preferably in the form of a casing 10, secured to the window frame 11 by means of screws 12. The casing is provided with a vertical bore or passageway 13 for the slidable reception of the lock operator 14 which includes a head or button 15 and a shank 16. The lower end of the shank has an axial bore 17 in which is located a rubber-like sleeve 18 having a nominal inside diameter smaller than that of the threaded shank 19 which constitutes the upper end of the conventional lock operating linkage. Since the sleeve is rubber-like it can be screwed or directly forced onto the shank 19 and adjusted to any desired longitudinal position.

The medial portion of shank 16 is necked down to provide a conical cam surface 20 for engagement with the detent face 22 of the latch 23. The latter includes a barrel or body portion 24 pivotally mounted in the opposed side walls of casing 10, the boss 26 being mounted in bore 27 and pin 28 extending thru bore 29 as best seen in Figure 7, a first arm 31 carrying the detent face 22, and a second arm 32 at approximately a right angle to said first arm and terminating in a lobe 33.

The latch operator, slidably mounted in bore 25, comprises a headless cylindrical pin 34 with a clearance cutout 36 adapted to receive lobe 33 and raise or lower it upon axial movement of the pin. Near its upper end the pin is formed with an annular groove 37 having a contrasting color, such as red. When the device is in inoperative position, as in Figure 4, the red groove is visible and serves as a warning. When the device is in operative position the upper end of the pin is substantially flush with the surface of the casing, being depressed at least enough so that it cannot be grasped and raised with the fingers, and the red danger mark is substantially out of sight.

When the pin 34 is depressed from the position of Figure 4 it pushes lobe 33 downwardly and swings arm 31 toward the right, as seen in Figure 4. If shank 16 has not yet been depressed, the arm will strike the full diameter portion of the shank with no useful effect. However, if the shank has been depressed to the position of Figure 5, then arm 31 will swing to a latching position in which detent face 22 engages cam surface 20.

A leaf spring 38 is mounted on base ledge 39 by means of rivets or the like 41. The spring has a gradual upward curve terminating in a reverse bend at 42. This bend cooperates with the angular end surface 43 of arm 31, as shown in Figures 4 and 5, to yieldingly retain the arm in either of the two positions there shown.

When the parts are in the position of Figure 5 the detent surface 22 is yieldingly held in blocking position with respect to cam 20. The conformation of button head 15 with its relatively sharp edges and hard surface is such that only a moderate pulling force can be applied with the fingers without extreme discomfort. This force is not sufficient to dislodge the detent and therefore the door cannot be manually unlocked from the inside.

If the conventional door lock operator is depressed when the door is open and the door is then forcefully closed the linkage is such that the push button is forced up by contact of the door latch with the keeper. If the present device were immovable in locked position, the slamming of a door would break or damage the linkage. Therefore the force of the spring 38 and the angular relation of the parts have been chosen so that normal release will occur. As indicated in Figure 5, the angle $a$ between the lower surface of cam 20 and the line extending from the pivot axis of latch 23 to the point of engagement of the cam surface with the detent 22 is of the order of 98 degrees. The angle $\beta$ is preferably of the order of 36 degrees. The spring force is less critical than the angle of contact but is desirably of the order of one to two pounds at point 42. With the arrangement and values set forth above the normal vertical force on shank 16 of a slammed door is sufficient to overcome spring 38 and move the latch 23 to inoperative position.

The barrel 24 of latch 23, as best seen in Figure 8, is provided with an axial bore 44 of substantial depth. A depression 46 having the conformation of a key, preferably the ignition key of the vehicle, is formed in the bottom of the bore. Since the bore opens out directly to the side of the casing the key may be readily inserted and turned to swing the latch out of engagement with the lock operator 14. Since the keyway is at the bottom of a small diameter bore a child cannot release the latch with a coin or other article he might have available. It is very difficult to release it even with a nail file because the tip of the file will not fit in the keyway.

It will be apparent that by substitution of the operator 14 for the original lock operator and the insertion of two screws 12, it is possible to provide an absolutely safe lock or latch to prevent a child from opening a vehicle door while the vehicle is in motion, and to avoid any interference with the conventional door operation when no children are to be carried in the rear seat. It will also be obvious that the device can be applied to the front doors of four door vehicles if necessary or desirable.

Figures 10 and 11 illustrate a device in which all parts are identical with the form first described except the latch 47 which has a single eared lobe 48, and the pin 49 which has a flanged or beaded lower end 51 which prevents the pin from moving upward out of the bore 25. A similar colored groove 52 is provided near the upper end. Since the pin is used only to push down on lobe 48 there is no need for a positive connection between them. The operation of this form is identical with that of the first form and the description will not be repeated.

A further modification is illustrated in Figures 12 and 13 in which all parts are again identical except for the cam and its operator which have been combined into a single unit 53 having a barrel 54 with a detent arm 56 and an integral operating arm 57. Since the arm 57 has some lateral movement, the opening 58 is somewhat elongated to accommodate it.

The casing 59 in Figures 14 and 15 is modified slightly to provide for a different position of the key operated barrel 61. The latter has an operating arm 62 with a ball end 63. The casing is provided with aligned bores 64 and 66 for the reception of pin 67 which has a groove 68, a lateral bore 69 to receive ball end 63, and a conical end 71 to engage the cam 20 of the lock operator. It is also provided with a pair of spaced depressions 72, 73 in its lower side.

A vertical bore 74 is formed in the medial body portion of the casing and in it are located a detent ball 76, a follower block 77, a compression spring 78, and a back up screw 79. The detent ball engages either of the depressions 72, 73 to yieldingly retain the pin in inoperative or operative position.

When the parts are in the position shown in Figure 15 the conical detent end 71 engages cam 20 and resists any effort to raise the shank 16 manually. However, if a vertical shock load results from slamming the door, the cam surface 20 will force the pin 67 to the left, overcoming the holding force of spring loaded ball 76 seated in depression 73. The latch can, of course, be released in the usual way by inserting a key in barrel 61 and rotating it.

Figures 16 and 17 illustrate a form of the invention which can be used without replacing the conventional lock operator. The casing 81 is mounted on the sill or window frame 82 thru which passes the conventional lock operator 83 having a head 84. An elongated locking pin 86 passes thru horizontally aligned bores 87 and 88 and has its lower portion cut away at 89 at its rightward end. Its upper surface is provided with a lateral bore 91 medially of its ends and its lower surface carries spaced depressions 92 and 93.

A vertical bore 94 is formed in the medial body portion of the casing and in it are located a detent ball 96, a follower block 97, a compression spring 98 and a back up screw 99. The detent ball engages either of the depressions 92, 93 to yieldingly retain the pin in inoperative or operative position. Since the rightward end 89 of the pin is exposed in operative position it is necessary to place a higher spring loading on the detent ball 96 than in the previous form, and slope detents 92 and 93 leftwardly.

When the pin 86 is in the rightward position, as shown in Figure 17, the end 89 overlies the lock operator 83, 84 which consequently cannot be raised. In this form of the invention, the operator will not release under shock load so it requires the use of greater care in operation of the vehicle door.

Barrel 101 is pivotally mounted in the upper part of the casing and is provided with an operating arm 102 having a ball end 103, the latter seating in the bore 91. When it is desired to release the latch in the usual way a key may be inserted in the barrel and rotated.

A special adaptation of the invention which may be installed in new automobiles at the time of their manufacture is shown in Figure 18. In this form, the support or casing 106 is mounted directly to the underside of sill or window frame 107 by means of screws 108. A vertical bore 109 is formed in the casing 106 to slidably receive lock operator 111 having a shank 112 and a button head 113, the shank being formed with a conical cam surface 114. A bore 116 is provided in the sill in alignment with the bore 109.

A second vertical bore 117 is provided in casing 106 to slidably receive pin 118 and a corresponding bore 119 is formed in the sill. A clearance cut out 121 is provided in pin 118 in the same manner and for the same purpose as the form first described. Barrel 122 is pivotally mounted in the side walls of the casing and has an operating arm 123 with a lobe 124 fitting in cut out 121, and a second arm 126 carrying a detent face 127 for engagement with the cam 114. Spring 128 is anchored to the bottom of the casing and its rightward end has a reverse bend 129.

The structure of all of the movable parts of this modification is identical with that of the form shown in Figures 3 to 9 and it functions in the same way, the key-hole being accessible thru an opening, not shown, in the side wall of the window sill or frame. For this reason it is believed to be unnecessary to repeat the description of the operation in detail. It will be noted that in this modification the only portions of the device which will be visible are the latch operating button 118 and the barrel 122, with a minimum resultant change in the usual appearance of the sill. While the mechanism is shown as attached to the underside of the sill it can, of course, be mounted on a portion of the sub-frame of the door and will operate in the same way.

It will be apparent that various changes and modifications of the structures disclosed can be made by those skilled in the art without departing from the invention and it is intended that all such changes and modifications shall be embraced within the scope of the following claims.

I claim:

1. Locking mechanism for a vehicle body door comprising: a casing substantially closed on the top and sides and open on the bottom, the edge of said open bottom being shaped to conform to the window frame of a vehicle door and mounted thereon; a vertical bore in the top wall of said casing; a door lock operator mounted for substantially vertical sliding movement in said bore and having a head extending above said casing; the lower end of said operator being connected to the door locking mechanism; a latch pivotally mounted within said casing on a substantially horizontal axis for swinging into and out of latching engagement with said lock operator; a headless latch operator mounted for substantially vertical sliding movement in said casing and articulated to said latch to swing it into engagement with said lock operator; said latch operator being of such length as to be substantially flush with the upper surface of said casing when said latch is engaged; and a pivot shaft recessed within a side wall of said casing and rotatable for moving said latch out of latching engagement; said shaft being formed for engagement by an operating tool.

2. Locking mechanism for a vehicle body door comprising: a casing; a door lock operator slidably mounted in said casing and having a finger-engageable head extending out of said casing; a cam surface formed on the body of said operator; a latch pivotally mounted within said casing and having a portion formed for engagement with said cam surface; means to move said latch into engagement with said operator; and resilient means to yieldingly retain said latch in said position; the resistance of said spring and the arrangement of said latch and cam surface being selected to prevent manual retraction of said lock operator but to yield to releasing shock load thereon.

3. Locking mechanism for a vehicle body door comprising: a casing; a pair of vertical, parallel bores in said casing; at least one horizontal bore in said casing located laterally between said vertical bores with its axis substantially normal to the plane including said vertical bores and serving as a bearing for a pivot shaft; a door lock operator mounted for sliding movement in one of said vertical bores and having a finger engageable operating head at its upper end and means at its lower end for connection to the locking mechanism of a door; a cam surface formed on the body of said operator and diverging downwardly from the axis of said operator; a latch having a pivot shaft rotatably mounted in said horizontal bore and swingable from a release position to a position in which a portion of said latch engages said cam surface when said operator is in its lowered, door-locking position; the pivot axis being above the point of engagement of the cam surface with the latch; the included angle between the downwardly diverging cam surface and the line extending from the pivot axis to said point of engagement being of the order of 98 degrees; an actuator slidably mounted in said other vertical bore and connected to said latch to swing it into engagement with said cam surface and resilient means to yieldingly retain said latch in said position.

4. Locking mechanism for a vehicle body door comprising: a casing; a pair of vertical, parallel bores in said casing; at least one horizontal bore in said casing located laterally between said vertical bores with its axis substantially normal to the plane including said vertical bores and serving as a bearing for a pivot shaft; a door lock operator mounted for sliding movement in one of said vertical bores and having a finger engageable operating head at its upper end and means at its lower end for connection to the locking mechanism of a door; a cam surface formed on the body of said operator and diverging downwardly from the axis of said operator; a latch having a pivot shaft rotatably mounted in said horizontal bore and swingable from a release position to a position in which a portion of said latch engages said cam surface when said operator is in its lowered, door-locking position; a cantilever leaf spring anchored within said casing and having a cam surface adjacent its free end; said latch having a second portion adapted to engage and pass over the cam surface of said spring whereby said latch is yieldingly held in engagement with the body of said operator; and an actuator slidably mounted in said other vertical bore for moving said latch into engagement with said operator.

5. Locking mechanism for a vehicle body door provided with a frame having an opening therein for access to a locking linkage comprising: a casing mounted on said frame and having a bore in alignment with said frame opening; a lock operator having a finger engageable head and a cylindrical shank slidably mounted in said bore and extending through said bore and said frame opening for engagement with said locking linkage; latch receiving means formed on a medial portion of said shank; a latch mounted within said casing and movable into latching engagement with said latch receiving means; and resilient means to yieldingly retain said latch in said last mentioned position.

6. Locking mechanism for a vehicle body door comprising: a support; a bore in said support; a lock operator having a head and a cylindrical shank slidable in said bore and rotatable in said bore in any axially adjusted position of said operator; an axial opening in the end of said shank remote from said head for reception of an element of a door latch operating means; a conical cam surface formed on said shank and having an axis coincident with the axis of said shank; and a latch carried by said support and movable into latching engagement with said cam surface in any rotational position of said shank.

7. In a vehicle body door having a keeper engaging bolt, an operating linkage, and a lock operator, all within the interior of said door; said operator having a shank axially slidably extending through an opening in said door to the exterior thereof, a casing mounted on said door and surrounding the intermediate part of the exterior portion of said shank, and a latch in said casing movable into latching engagement with a medial portion of said shank to prevent axial movement of said operator to an unlocking position.

8. Locking mechanism for a vehicle body door comprising: a casing; a door lock operator having a finger engageable head and a shank slidably received in said casing; latch receiving means on a medial portion of said shank; a latch carried by said casing and movable into engagement with said means in one position of said operator; and resilient means for yieldingly retaining said latch in latching position; said head having a relatively sharp finger engaging edge to prevent manual releasing movement of said operator against the opposition of said latch without extreme discomfort.

9. Locking mechanism for a vehicle body door comprising: a casing having a base for attachment to a door and an upper free surface; a vertical passage formed through said upper surface; a lock operator having an enlarged head and a shank fitting in and slidably carried by said passage; the lower end of said shank extending below said base to pass through said door and being formed at its extreme lower end with an axially extending bore for connection to a locking linkage; a latch receiving formation on a medial portion of said shank; and a latch carried by said casing and movable into latching engagement with said formation.

10. Locking mechanism for a vehicle body door provided with a keeper engaging member, a window frame having an access aperture, and operating and locking linkage within the interior of said door connected with said keeper engaging member and having an actuating shank of substantially smaller diameter than said aperture axially movably projecting through said aperture for push-pull movement to lock and unlock said door, comprising a generally cylindrical actuator having a finger grip at one end and an axial bore at the other end to receive and surround said shank, said shank-receiving end being adapted to enter said aperture in sliding guided engagement therewith, and safety means including a first portion surrounding said actuator and adapted to be attached to said window frame and a second portion carried by said first portion and movable to one position to prevent manual operation of said actuator and to another position to permit manual operation of said actuator.

JOSEPH M. SCHUMANN.

REFERENCES CITED

The following references are of record in the file of this patent:

UNITED STATES PATENTS

| Number | Name | Date |
| --- | --- | --- |
| 2,043,787 | Wild | June 9, 1936 |
| 2,165,775 | Winslow et al. | July 11, 1939 |
| 2,211,130 | Knapp | Aug. 13, 1940 |
| 2,314,400 | Janonis | Mar. 23, 1942 |
| 2,549,312 | Janonis | Apr. 17, 1951 |